US012578585B2

(12) United States Patent  
Komanduri et al.

(10) Patent No.: US 12,578,585 B2  
(45) Date of Patent: Mar. 17, 2026

(54) PIXEL SHIFTING A TIME-DIVISION MULTIPLEXED DISPLAY TO INCREASE PERCEIVED DISPLAY RESOLUTION

(71) Applicant: GOOGLE LLC, Mountain View, CA (US)

(72) Inventors: Ravi Kumar Komanduri, Milpitas, CA (US); Oleg Yaroshchuk, Mountain View, CA (US); Shreyas Potnis, Kitchener (CA); Michael Anthony Klug, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 316 days.

(21) Appl. No.: 18/502,301

(22) Filed: Nov. 6, 2023

(65) Prior Publication Data

US 2025/0147330 A1    May 8, 2025

(51) Int. Cl.  
*G02B 27/28*        (2006.01)  
*G02B 27/01*        (2006.01)

(52) U.S. Cl.  
CPC ....... *G02B 27/283* (2013.01); *G02B 27/0172* (2013.01); *G02B 27/286* (2013.01); *G02B 2027/0147* (2013.01)

(58) Field of Classification Search  
None  
See application file for complete search history.

(56) References Cited

U.S. PATENT DOCUMENTS

| 2005/0185139 A1 | 8/2005 | Yamanaka et al. |
| 2007/0297054 A1 | 12/2007 | Yao et al. |
| 2021/0349326 A1 | 11/2021 | Peng et al. |
| 2022/0075199 A1 | 3/2022 | Trisnadi et al. |

OTHER PUBLICATIONS

JVC, "4K e-shift3 Technology", accessed on Aug. 3, 2023 from <<https://eu.jvc.com/microsite/eu/dla-x900r/feature01.html>>; 5 pages.

Kim, K.H. et al., "Polarization-sensitive optical frequency domain imaging based on unpolarized light", Optics Express, vol. 19, No. 2; Jan. 17, 2011; 10 pages.

Lan, H.C. et al., "Non-mechanical sub-pixel image shifter for acquiring super-resolution digital images", Optics Express, vol. 17, No. 25; Dec. 7, 2009; pp. 22992-23002.

Optotune, "Beam Shifting", accessed on Aug. 3, 2023 from <<https://www.optotune.com/beam-shifting>>; 4 pages.

(Continued)

*Primary Examiner* — Richard H Kim

(57)        ABSTRACT

A time-division multiplexed projection display is pixel shifted to produce an increased perceived display resolution. A polarizing beam splitter (PBS) divides input unpolarized display light into two orthogonal linear polarizations and directs them to two PBS arms. The PBS arms act to shift the light in synchronization with the time-multiplexed display such that a single pixel of the light engine providing the display light is converted into two or four virtual pixels, effectively increasing the perceived display resolution relative to the native resolution of the light engine. The PBS combines the light from both PBS arms into a single, unpolarized output that may then be projected into a lens or a waveguide incoupler to enable the light to propagate through a waveguide for display at a user's eye.

20 Claims, 14 Drawing Sheets

(56) References Cited

OTHER PUBLICATIONS

Projector Reviews, "4K DLP With XPR Technology", accessed on Aug. 3, 2023 from << https://www.projectorreviews.com/terms/4k-dlp-with-xpr-technology/>>; 3 pages.

Shevchenko, A. et al., "On experimental characterization of polarization fluctuation dynamics in random optical beams", Applied Optics, vol. 15, No. 10; Apr. 1, 2012; 4 pages.

Texas Instruments, "Texas Instruments DLP5532-Q1 Automotive DMD Micromirror Array"; accessed on Aug. 3, 2023 from <<https://www.mouser.com/new/texas-instruments/ti-dlp5532-q1-dmd-array/>>; 6 pages.

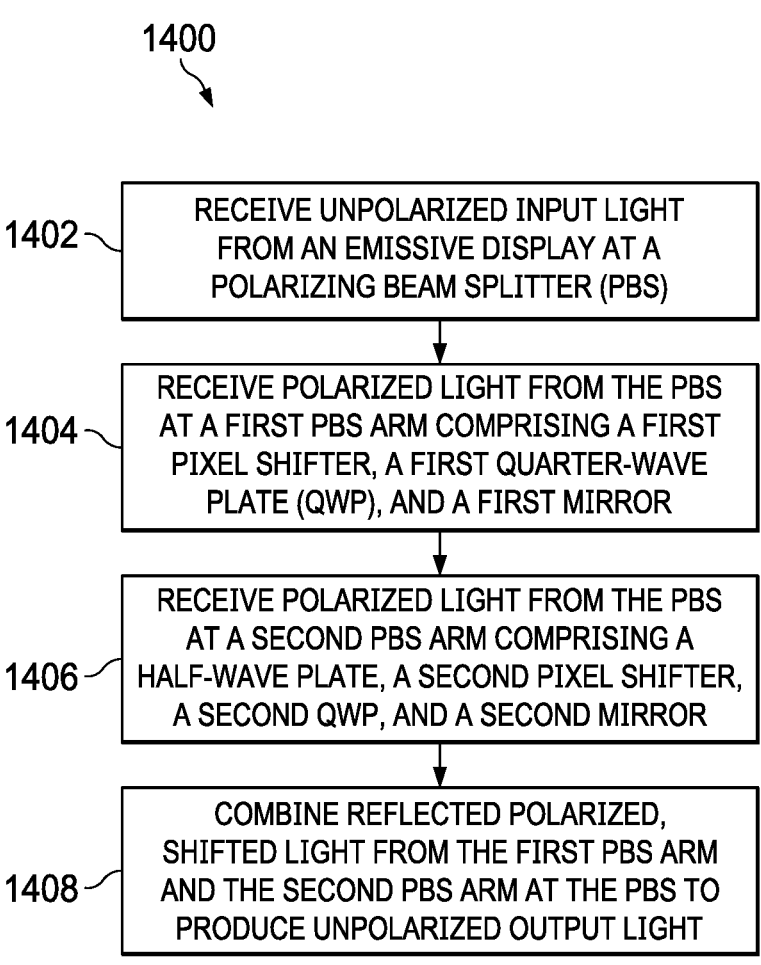

1400

1402 — RECEIVE UNPOLARIZED INPUT LIGHT FROM AN EMISSIVE DISPLAY AT A POLARIZING BEAM SPLITTER (PBS)

1404 — RECEIVE POLARIZED LIGHT FROM THE PBS AT A FIRST PBS ARM COMPRISING A FIRST PIXEL SHIFTER, A FIRST QUARTER-WAVE PLATE (QWP), AND A FIRST MIRROR

1406 — RECEIVE POLARIZED LIGHT FROM THE PBS AT A SECOND PBS ARM COMPRISING A HALF-WAVE PLATE, A SECOND PIXEL SHIFTER, A SECOND QWP, AND A SECOND MIRROR

1408 — COMBINE REFLECTED POLARIZED, SHIFTED LIGHT FROM THE FIRST PBS ARM AND THE SECOND PBS ARM AT THE PBS TO PRODUCE UNPOLARIZED OUTPUT LIGHT

FIG. 14

PIXEL SHIFTING A TIME-DIVISION MULTIPLEXED DISPLAY TO INCREASE PERCEIVED DISPLAY RESOLUTION

BACKGROUND

In an augmented reality (AR) or mixed reality (MR) eyewear display, light from an image source is coupled into a light guide substrate, generally referred to as a waveguide, by an input optical coupling such as an in-coupling grating (i.e., an "incoupler"). The input optical coupling can be formed on one or more surfaces of the substrate or disposed within the substrate. Once the light has been coupled into the waveguide, the incoupled light is "guided" through the substrate, typically by multiple instances of total internal reflection, to then be directed out of the waveguide by an output optical coupling (i.e., an "outcoupler"), which can also take the form of an optical grating. The outcoupled light projected from the waveguide overlaps at an eye relief distance from the waveguide forming an exit pupil, within which a virtual image generated by the image source can be viewed by the user of the eyewear display. The pixel density of a display panel determines image resolution and field of view of waveguide displays. Micro-light emitting diode ($\mu$LED) and micro-organic light emitting diode ($\mu$OLED) displays are becoming popular as image sources for AR displays. However, the pixel density of these displays is limited by surface physical processes that cause electroluminescence quenching in small volumes; the emission efficiency decreases as pixel size decreases. Typically the pixel pitch in modern $\mu$LED displays is greater than 2 $\mu$m to maintain acceptable luminous flux. Therefore, any approach that can increase resolution with such existing displays is extremely valuable.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 14 is a flow diagram of a method of pixel shifting a time-division multiplexed display to produce an increased perceived display resolution in accordance with some embodiments.

DETAILED DESCRIPTION

FIGS. 1-14 illustrate various techniques for pixel shifting a time-division multiplexed display to produce an increased perceived display resolution. In some embodiments, a polarizing beam splitter (PBS) divides input unpolarized display light into two PBS arms corresponding to the two optical paths created by the PBS reflecting and transmitting portions of the light. The PBS arms act to shift the light in synchronization with the time-multiplexed display such that a single pixel of the light engine providing the display light is converted into two or four virtual pixels, effectively increasing the perceived display resolution relative to the native resolution of the light engine. The PBS combines the light from both PBS arms into a single, unpolarized output that may then be projected into a lens, a waveguide, and/or an incoupler to enable the light to propagate through a waveguide for display at a user's eye. Various alternative implementations are disclosed using different arrangements of lenses, different types of mirrors, and X-cube arrangements. Various embodiments disclosed herein preserve the entire intensity of unpolarized input light in pixel shifting and provide exceptionally high uniformity of pixel shifting within a large field of view.

Figure 1:
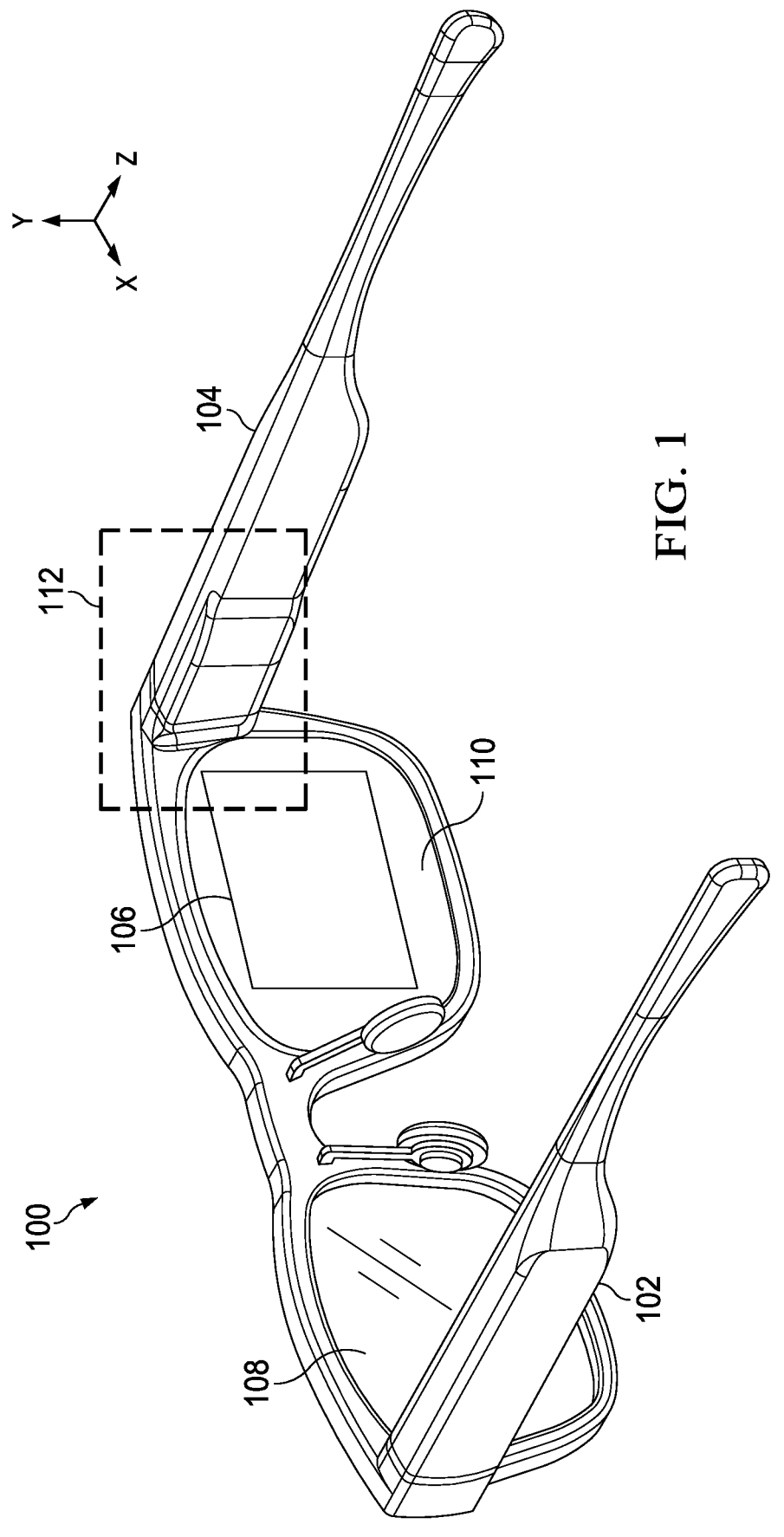
FIG. 1 is a diagram illustrating a rear perspective view of an augmented reality display device implementing an optical waveguide capable of pixel shifting a time-division multiplexed display to produce an increased perceived display resolution in accordance with some embodiments.

FIG. 1 illustrates an AR eyewear display system 100 capable of pixel shifting a time-division multiplexed display to produce an increased perceived display resolution in accordance with some embodiments. The AR eyewear display system 100 includes a support structure 102 (e.g., a support frame) to mount to a head of a user and that includes an arm 104 that houses a projection system, comprising an emissive micro-display (e.g., $\mu$LED or $\mu$OLED display) and projection optics (lenses, mirrors, pixel shifting optics)

configured to project display light representative of images toward the eye of a user along a preconfigured optical path, such that the user perceives the projected display light as a sequence of images displayed in a field of view (FOV) area 106 at one or both of lens elements 108, 110 supported by the support structure 102. In some embodiments, the light engine provides a time-division multiplexed display synchronized with one or more pixel shifters that act to produce an increased perceived display resolution by producing a plurality of virtual pixels from, e.g., a single pixel in the display. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like.

The support structure 102 further can include one or more batteries or other portable power sources for supplying power to the electrical components of the AR eyewear display system 100. In some embodiments, some or all of these components of the AR eyewear display system 100 are fully or partially contained within an inner volume of support structure 102, such as within the arm 104 in region 112 of the support structure 102. In the illustrated implementation, the AR eyewear display system 100 utilizes a spectacles or eyeglasses form factor. However, the AR eyewear display system 100 is not limited to this form factor and thus may have a different shape and appearance from the eyeglasses frame depicted in FIG. 1.

One or both of the lens elements 108, 110 are used by the AR eyewear display system 100 to provide an augmented reality display in which rendered graphical content can be superimposed over or otherwise provided in conjunction with a real-world view as perceived by the user through the lens elements 108, 110. For example, micro-display light or other display light is used to form a perceptible image or series of images that are projected onto the eye of the user via one or more optical elements, including a waveguide, formed at least partially in the corresponding lens element. One or both of the lens elements 108, 110 thus includes at least a portion of a waveguide that routes display light received by an incoupler (IC) (not shown in FIG. 1) of the waveguide to an outcoupler (OC) (not shown in FIG. 1) of the waveguide, which outputs the display light toward an eye of a user of the AR eyewear display system 100. Additionally, the waveguide employs an exit pupil expander (EPE) in the light path between the IC and OC, or in combination with the OC, in order to increase the dimensions of the display exit pupil. Moreover, each of the lens elements 108, 110 is sufficiently transparent to allow a user to see through the lens elements to provide a field of view of the user's real-world environment such that the image appears superimposed over at least a portion of the real-world environment.

Figure 2:
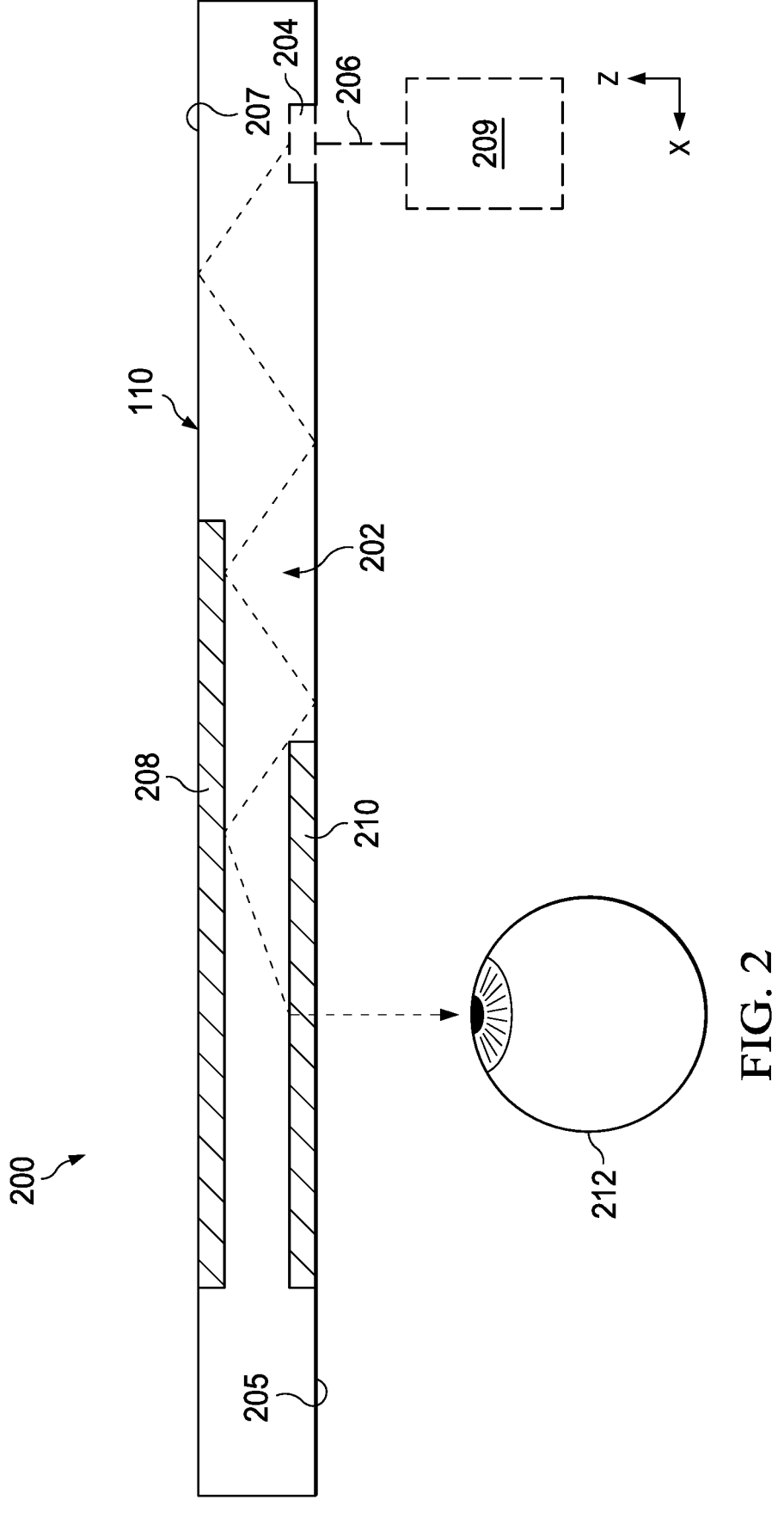
FIG. 2 is a diagram illustrating a cross-section view of an example implementation of the waveguide of FIG. 1 in accordance with some embodiments.

FIG. 2 depicts a cross-section view 200 of an implementation of a lens element 110 of an AR eyewear display system such as AR eyewear display system 100. Note that for purposes of illustration, at least some dimensions in the Z direction are exaggerated for improved visibility of the represented aspects. In this example implementation, a waveguide 202, which may form a portion of the lens element 110 of FIG. 1, implements diffractive optical structures in a region 208 on the opposite side of the waveguide 202 as diffractive optical structures of a region 210. In particular, the diffractive optical structures of an IC 204 are implemented on an eye-facing side 205 of the lens element 110. Likewise, the diffractive optical structures of region 210 (which provide OC functionality) are implemented at the eye-facing side 205. Further in the illustrated implementation, the diffractive optical structures of region 208 (which provide EPE functionality) are implemented at a world-facing side 207 of the lens element 110 that is opposite the eye-facing side 205. Thus, under this approach, display light 206 from a light source 209 including components capable of pixel shifting a time-division multiplexed display to produce an increased perceived display resolution is incoupled to the waveguide 202 via the IC 204, and propagated (through total internal reflection in this example) toward the region 208, whereupon the diffractive optical structures of the region 208 diffract the incident display light for exit pupil expansion purposes, and the resulting light is propagated to the diffractive optical structures of the region 210, which output the display light toward a user's eye 212. In other implementations, the positions of regions 208 and 210 may be reversed, with the diffractive optical structures of region 210 formed on the world-facing side 207 and the diffractive optical structures of region 208 formed on the eye-facing side 205, however, this may result in the regions 208 and 210 having different positions, dimensions, and shapes, and also may require different diffractive optical structures in each region to have different characteristics.

Figure 3:
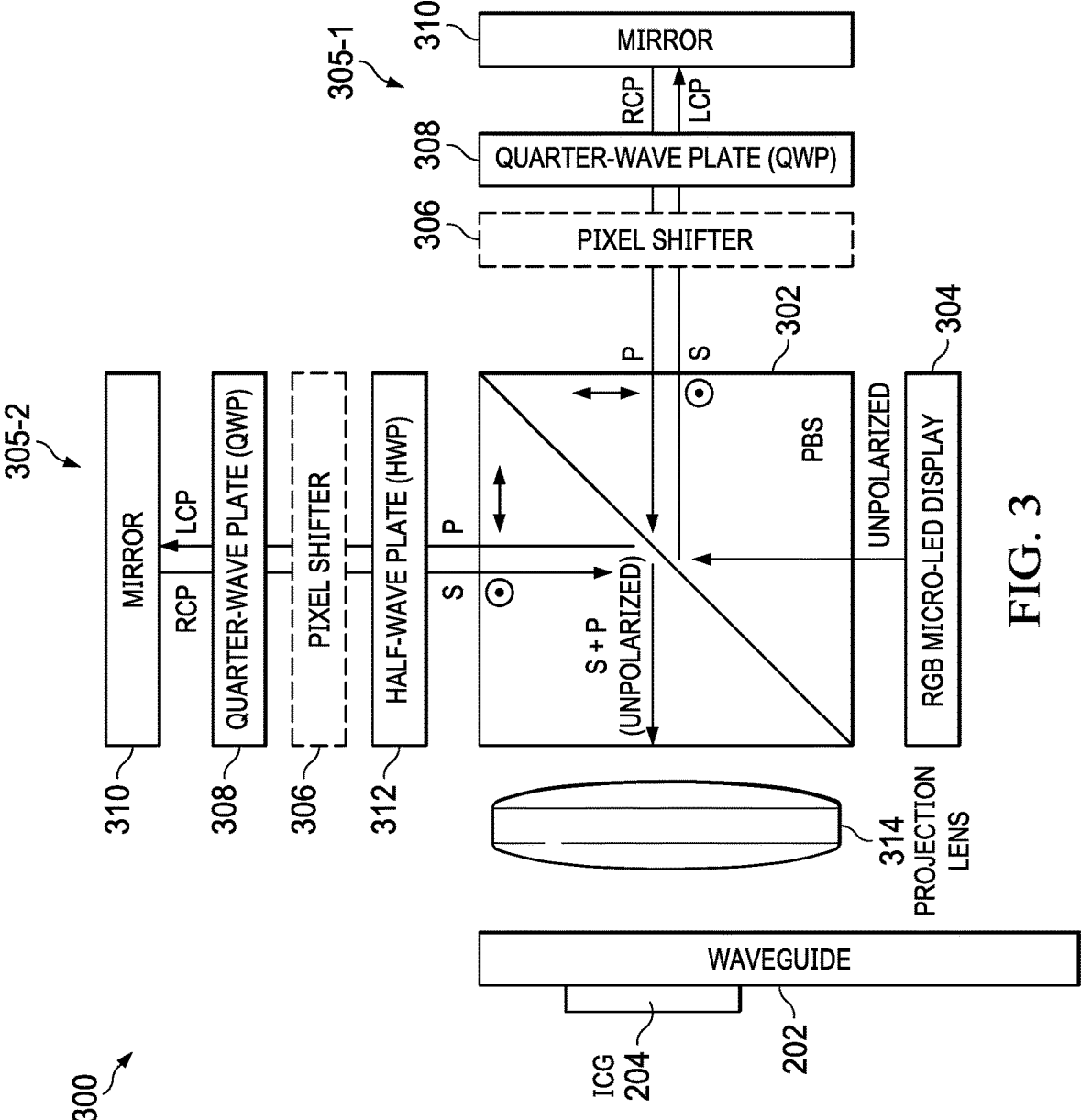
FIG. 3 is a diagram illustrating a device configured to pixel shift a time-division multiplexed display to produce an increased perceived display resolution in accordance with some embodiments.

FIG. 3 is a diagram illustrating a device 300 configured to pixel shift a time-division multiplexed display to produce an increased perceived display resolution in accordance with some embodiments. The device 300 or portions of the device 300 may be used as the light source 209 of FIG. 2 or positioned between the light source 209 and the IC 204 along the path of the display light 206, as described further herein. In some embodiments, the device 300 is fully or partially contained within an inner volume of the support structure 102 of FIG. 1, such as within the arm 104 in region 112. Generally, the device 300 operates by generating virtual pixels at different locations based on each individual pixel of a light engine that provides a time-division multiplexed display synchronized with the generation of the virtual pixels. In this way, a light engine with a particular resolution or pixel pitch may be used to produce an increased perceived display resolution. As the light engine produces pixels in successive subframes (e.g., fractions of an individual display frame of a display producing frames at, for example, 30 or 60 frames per second) corresponding to virtual pixels offset slightly from the actual pixels of the light engine, the device 300 shifts the light from the pixels of the light engine to the intended locations of the virtual pixels, typically at intermediate locations between the actual pixel and actual neighboring pixels, which may result in a perceived display of double or quadruple the resolution relative to the resolution of the light engine.

The device 300 includes a polarizing beam splitter (PBS) 302, which is an optical device that divides incoming light into two perpendicular polarization components. A PBS typically consists of a special coating along a diagonal face that produces polarization dependent reflection or transmission (similar to those produced by companies such as 3M which consist of several layers of birefringent films), which is embedded between two 45° right-angle prisms made from conventional isotropic glass material such as BK7. One component of light received at the PBS 302 is transmitted while the other component of light is reflected, allowing for the separation of light based on its polarization state. For example, as shown in FIG. 3, the PBS is positioned to receive unpolarized light from a light engine, such as a micro-display 304 or other emissive display capable of producing red, green, and blue (RGB) light. The PBS 302 divides the light from the micro-display 304 into perpendicular polarization components, typically referred to as S and P polarization components. S and P polarization refer to two perpendicular orientations of light's electric field vector relative to a surface. S (short for "s-polarization") has an electric field perpendicular to the incident plane, while P (short for "p-polarization") has an electric field parallel to the incident plane.

As shown in FIG. 3, a first PBS arm 305-1 is positioned to receive S polarized light from the PBS 302 and a second PBS arm 305-2 is positioned to receive P polarized light from the PBS 302. The first PBS arm 305-1 includes a pixel shifter 306, a quarter-wave plate (QWP) 308, and a mirror 310, while the second PBS arm 305-2 includes a half-wave plate 312, a pixel shifter 306, a QWP 308, and a mirror 310. Half-wave plates rotate the polarization of linearly polarized light to twice the angle between the retarder fast axis and the plane of polarization. Placing the fast axis of a half-wave plate at 45° to the polarization plane results in a polarization rotation of 90°. Similarly, QWPs are used to turn linearly polarized light into circularly polarized light and vice versa. To do this, the waveplate must be oriented so that equal amounts of fast and slow waves are excited. As described further herein in FIGS. 5-7, by using reflective pixel shifters that use, e.g., birefringent slabs to produce offsets in light paths like those of the first PBS arm 305-1 and the second PBS arm 305-2, the amount of offset the pixel shifters 306 are able to produce in virtual pixels is effectively doubled compared to transmissive designs (e.g., designs that do not utilize mirrors 310) using the same pixel shifters 306. Additionally, by using reflective pixel shifters like those of the first PBS arm 305-1 and the second PBS arm 305-2, pixel shifting is substantially uniform over an intended field of view compared to transmissive designs.

In the first PBS arm 305-1, after the S polarized light is transmitted through the pixel shifter 306 and the QWP 308, reflected by the mirror 310, and passes back through the QWP 308 and pixel shifter 306, the S polarized light is converted to P polarized light, which is then transmitted through the PBS 302. Similarly, in the second PBS arm 305-2, after the P polarized light is transmitted through the half-wave plate 312, the pixel shifter 306, and the QWP 308, reflected by the mirror 310, and passes back through the QWP 308, the pixel shifter 306, and the half-wave plate 312, the P polarized light is converted to S polarized light, which is then reflected by the PBS 302. The half-wave plate 312 adjusts the polarization state of light entering the PBS arm 305-2 such that the pixel shifter 306 in the second PBS arm 305-2 behaves similar to the pixel shifter 306 in PBS arm 305-1. As shown in FIG. 3, the PBS 302 combines the reflected polarized, shifted light from the first PBS arm 305-1 and the second PBS arm 305-2 to produce unpolarized output light. In this way, up to 100% of unpolarized light from the micro-display 304 is retained and an unpolarized output is provided by the PBS 302 through the combination of the P polarized light from the first PBS arm 305-1 and the S polarized light form the second PBS arm 305-2. As shown in FIG. 3, the unpolarized output light from the PBS 302 may then be transmitted into a projection lens 314, into a waveguide such as the waveguide 202 of FIG. 2, reflected off or diffracted by an IC 204, transmitted through the waveguide 202, and outcoupled by an OC such that the output light is provided in a field of view perceivable by a user's eye 212. As alluded to above, when input light from an emissive display such as the micro-display 304 is time-division multiplexed (i.e., producing offset displays in sequential subframes to display offset pixel information corresponding to virtual pixels produced by the PBS 302) in synchronization with switching (i.e., enabling and disabling the light shifting function of one or more birefringent slabs) of the pixel shifter 306 in the first PBS arm 305-1 and the pixel shifter 306 in the second PBS arm 305-2, a plurality of virtual pixels is produced in the unpolarized output light from each pixel of the micro-display 304, effectively increasing the perceived display resolution compared to the native display resolution of the micro-display 304. In some embodiments, additional lens elements are located within the PBS arms between the micro-display 304 and the PBS 302, and in some embodiments the mirrors are curved, contributing to the projection lens function while keeping the projection system size compact. In some embodiments, one or more additional isotropic slabs are inserted into the PBS arm 305-1 to compensate for any additional passive shift caused by the half-wave-plate 312 in PBS arm 305-2.

Figure 4:
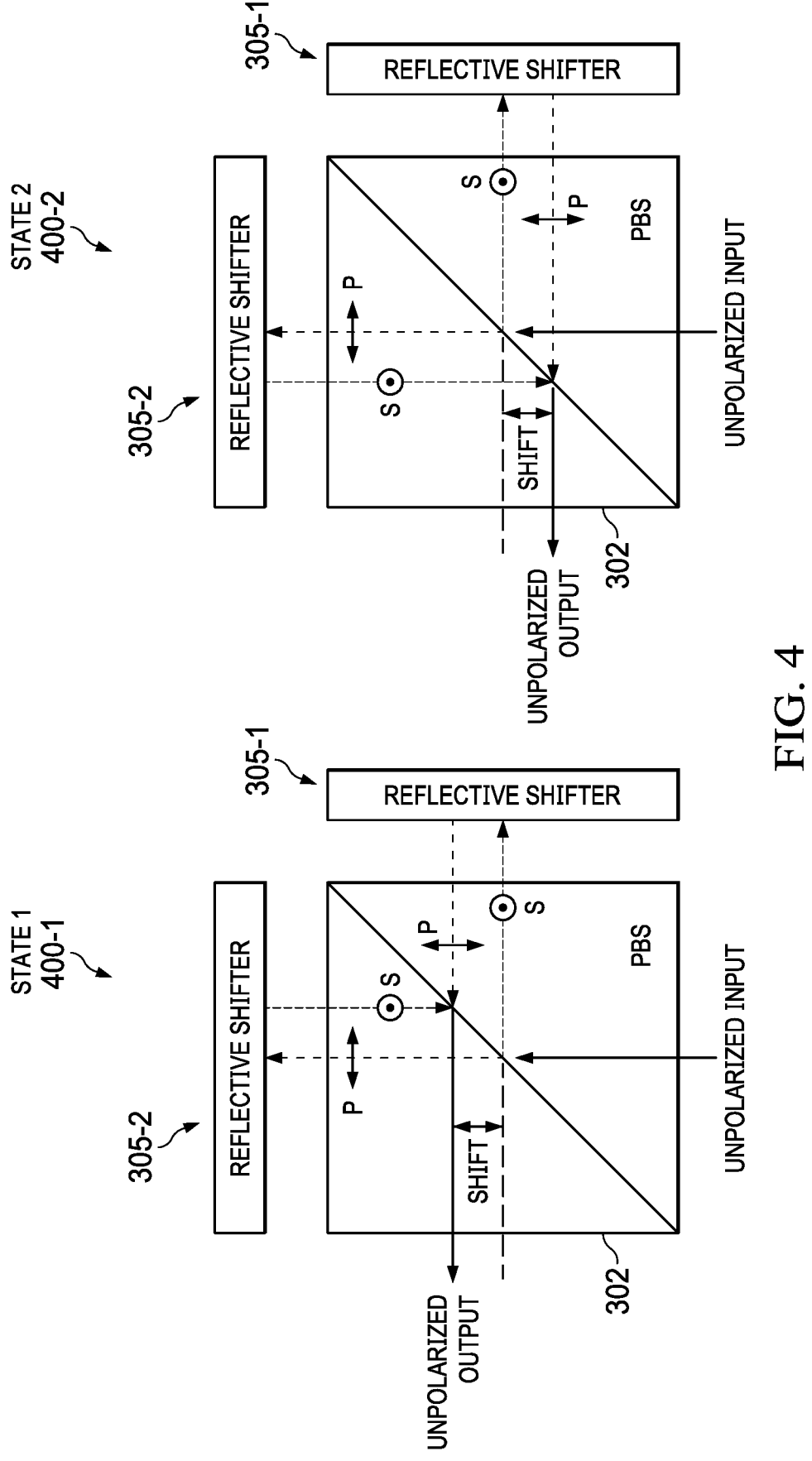
FIG. 4 is a set of diagrams illustrating an example of pixel shifting using a device like that of FIG. 3 in accordance with some embodiments.

FIG. 4 is a set of diagrams 400 illustrating an example of pixel shifting using a device 300 such as that of FIG. 3 in accordance with some embodiments. As shown in diagram 400-1, reflective shifters corresponding to the first PBS arm 305-1 and the second PBS arm 305-2 of FIG. 3 provide a positive vertical shift relative to the orientation of the drawing, while in the second diagram 400-2, the reflective shifters provide a negative vertical shift relative to the orientation of the drawing. In some embodiments, the virtual pixels produced through the pixel shifting are shifted by a distance of half the native pixel pitch of the light engine providing the input light such that virtual pixels are added in an amount equal to the amount of the native pixels. In some embodiments, within each state, the shifts provided by the two PBS arms 305-1 and 305-2 are such that they can be combined by the PBS 302 into a single beam. For example, in diagram 400-1, relative to the pixel shifters 306, PBS arm 305-1 provides a shift that is to the left of the input beam while PBS arm 305-2 provides a shift that is to the right of the input beam, and vice-versa for diagram 400-2. Therefore, relative to the pixel shifters 306, the direction of shift is opposite for each PBS arm 305-1 and 305-2. Note that this example assumes the absence of lens elements in the PBS arms 305-1 and 305-2, and that the mirrors in the reflective shifter are flat. In these situations where certain elements of the PBS arms provide part or all of the projection lens function, the amount of vertical shift in two states shown in FIG. 4 could be different; however, the difference between the two shifts would still be nearly equal to half the native pixel pitch along each of the shifting directions. In some embodiments, the pixel shifters 306 in both PBS arms 305-1 and 305-2 are matched and configured so as to provide an identical amount of shift in both states (e.g., the states illustrated in diagrams 400-1 and 400-2) to avoid double image artifacts.

Figure 5:
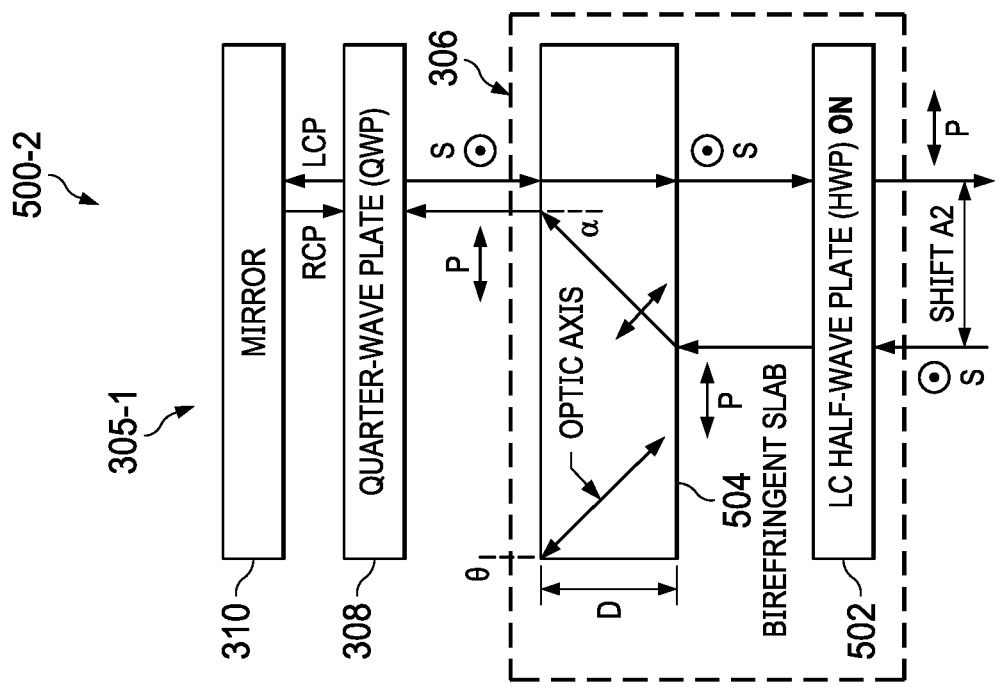
FIG. 5 is a set of diagrams illustrating an example operation of a unidirectional pixel shifter in a first arm of a device like that of FIG. 3 in accordance with some embodiments.
Figure 5:
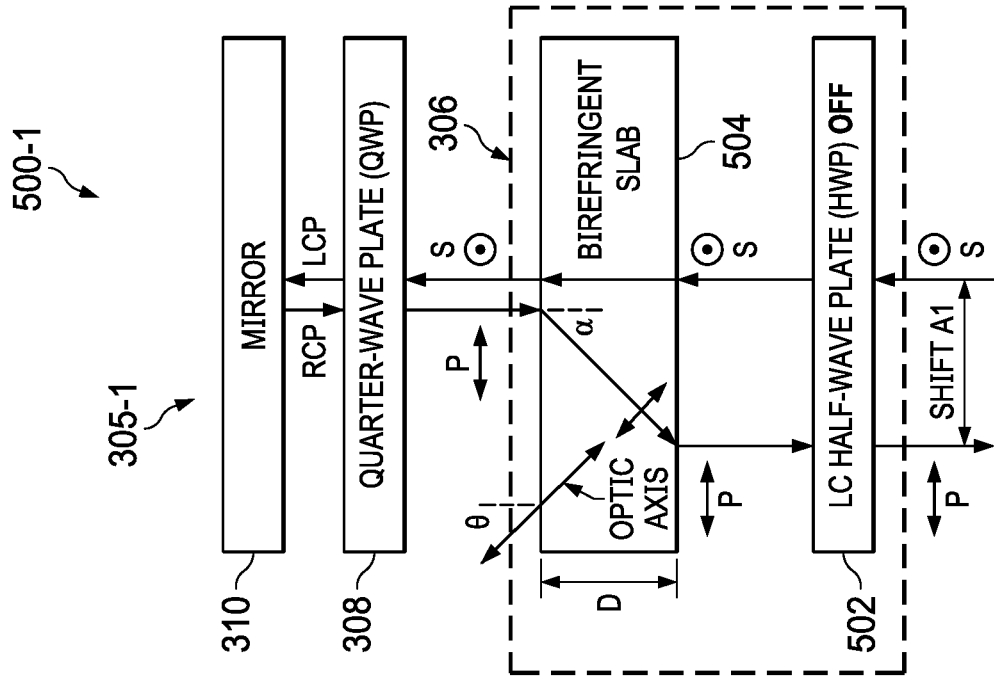

FIG. 5 is a set of diagrams 500 illustrating an example operation of the unidirectional pixel shifter 306 in the first arm 305-1 of the device 300 of FIG. 3 in accordance with some embodiments. As illustrated in FIG. 5, the pixel shifter 306 includes a switchable half-wave plate 502 and a birefringent slab 504. The birefringent slab 504 has an optic axis that is at an angle θ with respect to the surface as shown. Because of this property, P-polarized light undergoes a shift even at normal incidence while S-polarized light does not shift, as shown. Although the switchable half-wave plate 502 in this example is a liquid crystal half-wave plate, generally, the switchable half-wave plate 502 may be any polarization switch, such as a binary polarization switch or a switchable polarization rotator, that rotates linear polarization of light by 90° (such as a nematic or ferroelectric liquid crystal switchable half-wave plate or a twisted nematic (TN) liquid crystal switch). In some embodiments, the switchable half-wave plate 502 has its optic axis parallel to its surface, and at +45° in-plane with respect to the plane of FIG. 5. Similarly, the birefringent slab 504 may be implemented using any anisotropic material with positive or negative birefringence, such as an anisotropic crystal plate, a liquid crystal (active or polymerizable) cell or film, or a stretched or photoaligned polymer film.

In some implementations, the birefringent slab 504 may be implemented using a stack of birefringent slabs. In general, the birefringent slab 504 may be positioned perpendicular to the incident light beam. The optical axis of the birefringent slab 504 may be tilted with respect to a normal axis of the first birefringent slab at which light is directed into the first birefringent slab from the PBS 302. For example, the tilt of the optic axis of the birefringent slab 504 may be oriented at 45 degrees relative to a normal axis of the birefringent slab 504, such that a maximum shift between beams of S and P polarization is provided. However, in some embodiments, the birefringent slab 504 may be oriented obliquely to the incident light beam, in which case the optical axis of the birefringent slab 504 may be at any appropriate angle relative to the normal axis of the birefringent slab 504 to create a desired amount of shift between beams of S and P polarization. In some embodiments, the birefringent plate 504 may be tilted relative to the incident light beam to adjust the amount of shifting to a desired amount.

As illustrated in diagram 500-1, when the switchable half-wave plate 502 is disabled or switched off, the normally incident input S-polarized light is unaffected by it, as the birefringent slab 504 does not shift this beam. Then the QWP 308 optic axis is such that it converts the S-polarized beam into a left circularly polarized (LCP) beam, which is converted to a right circularly polarized (RCP) beam by mirror reflection. This RCP light is then converted to P-polarized light by the QWP 308. Therefore, the QWP 308 and mirror 310 combination acts like a reflective linear polarization rotator. The P-polarized beam is then shifted left by the birefringent slab, and the polarization of the beam is unaffected by the switchable half-wave plate 502. In this manner, the first PBS arm 305-1 produces a first shift A1 when the half-wave plate 502 is off, producing a virtual pixel to the left of the incident light relative to the orientation of the drawing. On the other hand, as illustrated in diagram 500-2, when the switchable half-wave plate 502 is enabled or switched on, the switchable half-wave plate 502 rotates the S-polarized light to P-polarized light, which is shifted to the right by the birefringent slab 504. The QWP 308 and mirror 310 combination rotates the P-polarized to S-polarized light upon reflection, which is not offset by the slab. Then the switchable half-wave plate 502 rotates the S-polarized light into P-polarized light. In this way, the first PBS arm 305-1 produces a second shift A2 when the switchable half-wave plate 502 is on, producing a virtual pixel to the right of the incident light relative to the orientation of the drawing. Accordingly, as can be seen in FIG. 5, selectively switching the switchable half-wave plate 502 produces two virtual pixels at two different locations, which are then propagated through the PBS 302 into the unpolarized output light. Note that in both the switch states, the input polarization into the PBS arm 305-1 is S-polarized while the output back into the PBS is P-polarized. This ensures that the PBS 302 can affect the beam in the same manner for both states of the polarization switch. Furthermore, to relate FIG. 5 to FIG. 4, diagram 500-1 refers to the state of the PBS arm 305-1 in diagram 400-1 of FIG. 4, where the beam shift is to the left of the input beam in that arm, and diagram 500-2 refers to the state of the PBS arm 305-1 in diagram 400-2 of FIG. 4 where the beam shift is to the right of the input beam in that arm.

In embodiments in which the mirrors 310 in FIG. 5 are flat, shifts A1 and A2 are identical in magnitude. This symmetry can be used to simplify the general configuration shown in FIG. 3. As discussed above, in diagram 500-2, the switchable half-wave plate 502 is on and rotates the input S-polarized light to P-polarized light. Therefore, the configuration of diagram 500-2 can be used as PBS arm 305-2 when the switchable half-wave plate is off and the input is P-polarized. Using this configuration, the same shift to the right is achieved, although the input light is P-polarized and the output light is S-polarized. This is exactly the requirement for STATE 1 from PBS arm 305-2 as shown in FIG. 4. Therefore, in some embodiments, such as those using flat mirrors 310, the same exact configuration of elements can be used in both PBS arms 305-1 and 305-2. STATE 2 is also satisfied automatically. This is one example configuration for an embodiment using flat mirrors 310 where the PBS arms 305-1 and 305-2 are identical to each other. In this configuration, in some embodiments, the switchable half-wave plates 502 in both PBS arms 305-1 and 305-2 are either both off or both on at the same time and always have the same state.

In another embodiment, the states of switchable half-wave plates are opposite, i.e., when one is on, the other is off, and vice versa. For example, in diagram 500-1, the switchable half-wave plate 502 is off and the beam shift is to the left. Because the switchable half-wave plate 502 is off, the switchable half-wave plate does not rotate the input S-polarized or the output P-polarized light. If the assembly shown in diagram 500-1 is rotated by 180° around its optical axis, the shift is to the right rather than to the left. The same shift is maintained if the input is P-polarized and the switchable half-wave plate is on. This is again exactly the same requirement for STATE 1 from PBS arm 305-2 as shown in FIG. 4. Therefore, by having switchable half-wave plates 502 in different states in both the PBS arms 305-1 and 305-2 and by rotating one arm by 180°, the configuration of FIG. 3 can be simplified. In embodiments such as these, the passive half-wave plate 312 shown in FIG. 3 may be omitted.

Figure 6:
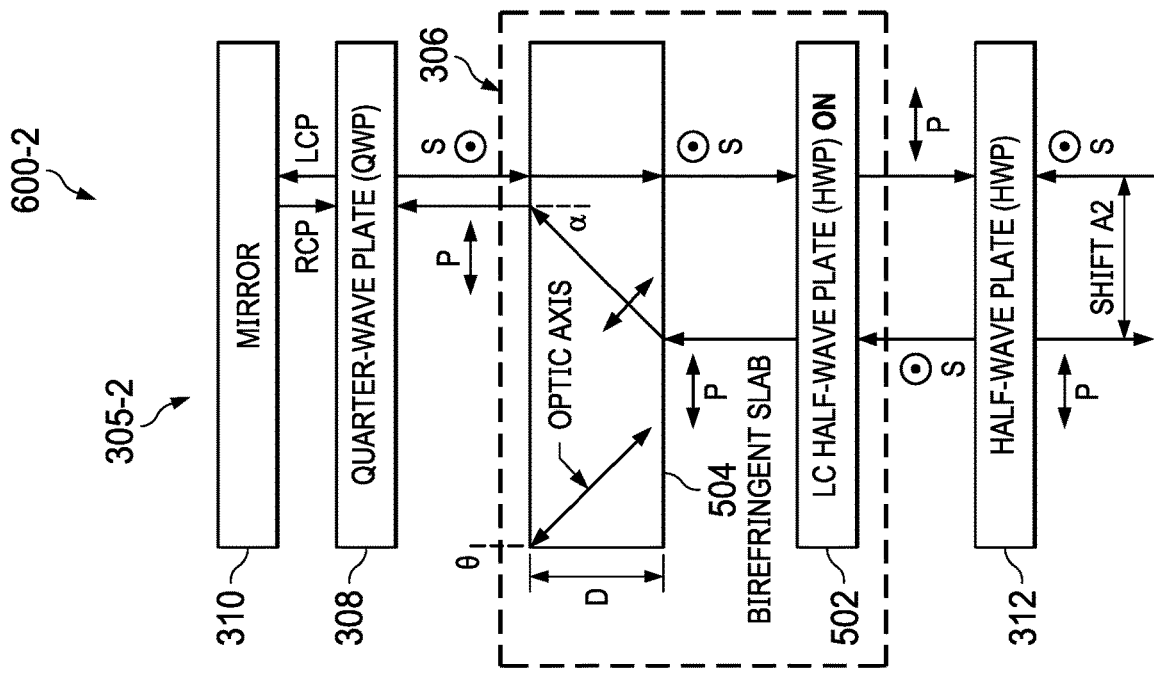
FIG. 6 is a set of diagrams illustrating an example operation of a unidirectional pixel shifter in a second arm of a device like that of FIG. 3 in accordance with some embodiments.
Figure 6:
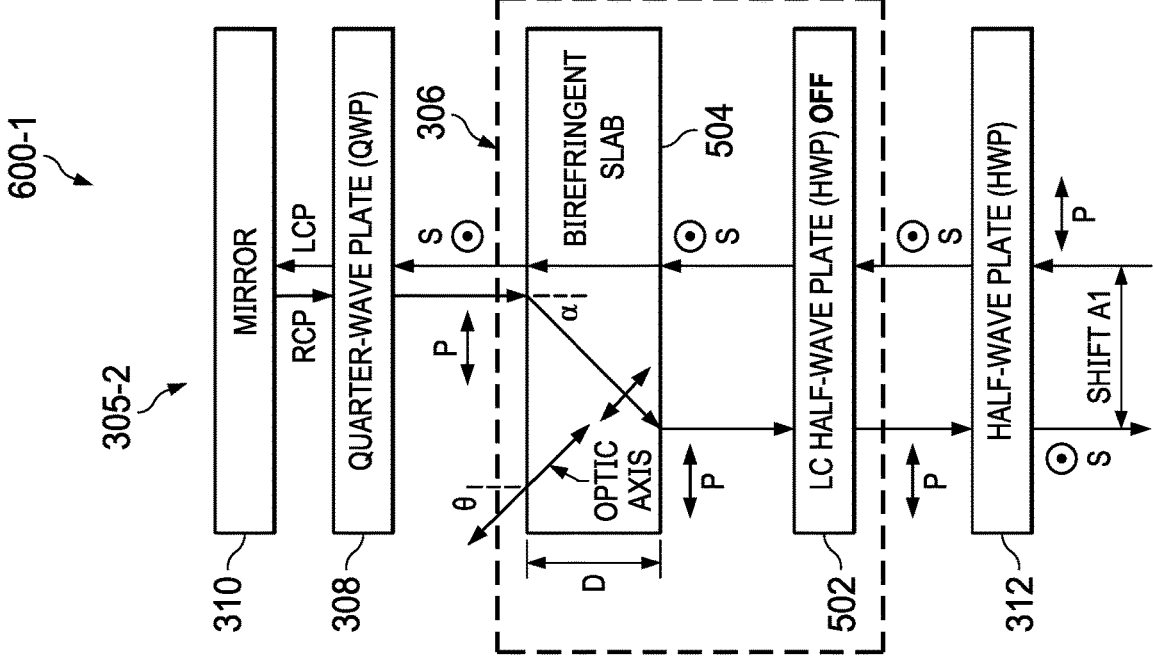

FIG. 6 is a set of diagrams 600 illustrating an example operation of the unidirectional pixel shifter 306 in the second arm 305-2 of the device 300 of FIG. 3 in accordance with some embodiments. Notably, the configurations discussed here relate to a general case that functions regardless of whether there are lens elements within either PBS arm or whether the mirrors 310 are flat or curved. As shown in FIG. 6, the pixel shifter 306 in the second arm 305-2 is substantially identical to that of the pixel shifter 306 in the first arm 305-1 and produces different virtual pixels at different locations when the switchable half-wave plate 502 is disabled, as in diagram 600-1, or enabled, as in diagram 600-2. Because the PBS 302 produces orthogonally linearly polarized beams in both the first arm 305-1 and the second arm 305-2, the additional passive half-wave plate 312 rotates the polarization state of the beam as it passes in and out of the second arm 305-2 so that this arm functions in an identical fashion as the first arm 305-1. Further, in both the switch states, the input polarization into the second arm 305-2 is P-polarized while the output back into the PBS 302 is S-polarized. As shown in FIG. 3, these output polarization states from both PBS arms are such that the beams are recombined by the PBS 302 and directed toward the projection lens rather than back towards the micro-display 304. To build the optical assembly shown in FIG. 4 using the arms 305-1 and 305-2 in FIG. 5 and FIG. 6, respectively, the second arm 305-2 is rotated 180° around its optical axis, e.g., the vertical axis of FIG. 6. In this case, the second arm 305-2 provides a left shift when the first arm 305-1 provides a right shift and vice versa. In some embodiments, the opposite direction of shift in the arms 305-1 and 305-2 is needed to combine the beams output from the two arms into the same beam at the PBS 302.

The configuration of FIG. 6 is particularly useful when the switchable half-wave plates 502 in the PBS arms 305-1 and 305-2 are synchronized with the same states (on or off) at each moment in time, requiring the additional half-wave plate 312 to adjust the polarization states accordingly. Alternatively, in some instances, the same function can be achieved if the states of switchable half-wave plate 502s in PBS arms 305-1 and 305-2 are synchronized with opposite states (i.e., when one is on, the other one is off, and vice versa). This eliminates the need for the additional passive half-wave plate 312 within PBS arm 305-2 and eliminates any need to rotate this arm by 180° for alignment. For example, in FIG. 6, operation of the assembly in diagram 600-1 can be maintained if the switchable half-wave plate 502 is on instead of off if the passive half-wave plate 312 is omitted. In this way, rather than rotating this configuration by 180° in plane, the assembly of diagram 600-1 can be used as-is. However, it is noted that the assembly in diagram 600-1 would then correspond to the state of PBS's arm 305-2 in diagram 400-2 (shift to left from the second PBS arm 305-2) of FIG. 4. Similarly, the assembly in diagram 600-2 serves the purpose of the state of PBS arm 305-2 in diagram 400-1 (shift to the right from the second PBS arm 305-2) by changing the state of the switchable half-wave plate 502 to off and omitting the passive half-wave plate 312. It will be understood that the configurations and arrangement of elements shown in FIG. 5 and FIG. 6 are examples only. The relative directions of the optical axes of the birefringent plates, the states and relative orientations of switchable half-wave plates 502, and the presence or absence of half-wave plates 502 in the two PBS arms 305-1 and 305-2 are design parameters that can be used to ensure the conditions in FIG. 4 are satisfied.

Figure 7:
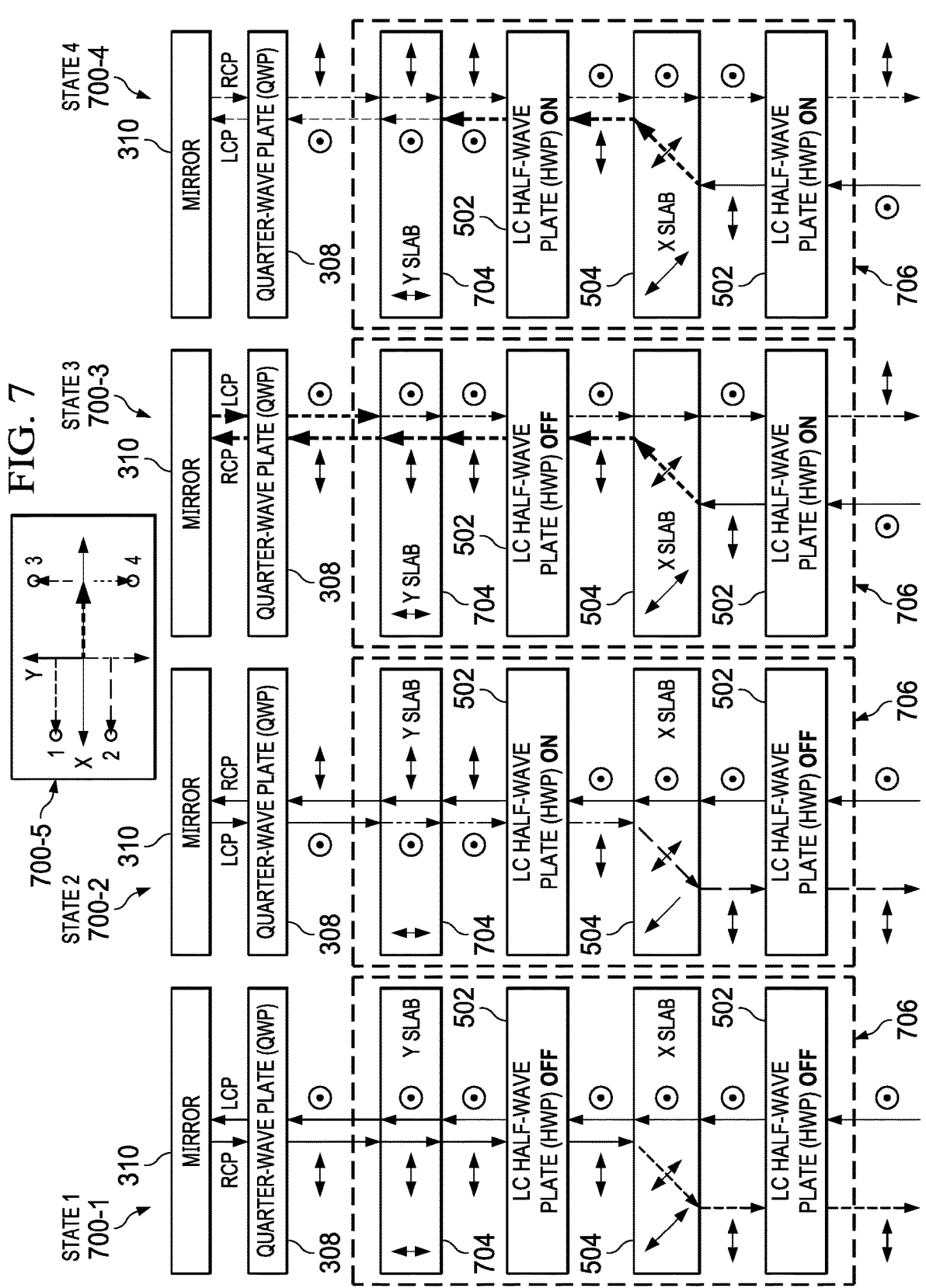
FIG. 7 is a set of diagrams illustrating an example operation of a bidirectional pixel shifter in a first arm of a device like that of FIG. 3 in accordance with some embodiments.

FIG. 7 is a set of diagrams 700 illustrating an example operation of a bidirectional pixel shifter 706 that may be provided in one or both of the first arm 305-2 and the second arm 305-2 of a device such as the device 300 of FIG. 3 in accordance with some embodiments. In order to double the number of virtual pixels produced by a device such as the device 300 of FIG. 3, as shown in FIG. 7, a pixel shifter such as the bidirectional pixel shifter 706 may be used, which includes a second switchable half-wave plate 502 and a second birefringent slab 704. As shown in FIG. 7 between diagrams 700-1, 700-2, 700-3, and 700-4, the second birefringent slab 704 may have an optical axis orthogonally aligned with or otherwise varying from the optical axis of the first birefringent slab 504 in order to produce a second amount of pixel shifting relative to the first birefringent slab 504. For example, as shown in diagram 700-1, the shift produced by disabling both switchable half-wave plates 502 in the bidirectional pixel shifter 706 results in a virtual pixel located at position 1 of diagram 700-5. As shown in diagram 700-2, the shift produced by disabling a first one and enabling a second one of the switchable half-wave plates 502 in the bidirectional pixel shifter 706 results in a virtual pixel located at position 2 of diagram 700-5. As shown in diagram 700-3, the shift produced by enabling a first one and disabling a second one of the switchable half-wave plates 502 in the bidirectional pixel shifter 706 results in a virtual pixel located at position 3 of diagram 700-5. As shown in diagram 700-4, the shift produced by enabling both switchable half-wave plates 502 in the bidirectional pixel shifter 706 results in a virtual pixel located at position 4 of diagram 700-5. Accordingly, by selectively switching the first switchable half-wave plate 502 and the second switchable half-wave plate 502 in the bidirectional pixel shifter 706, four virtual pixels may be produced at four different locations, which may then be propagated through the PBS 302 and combined in the unpolarized output light produced by the PBS 302.

Figure 8:
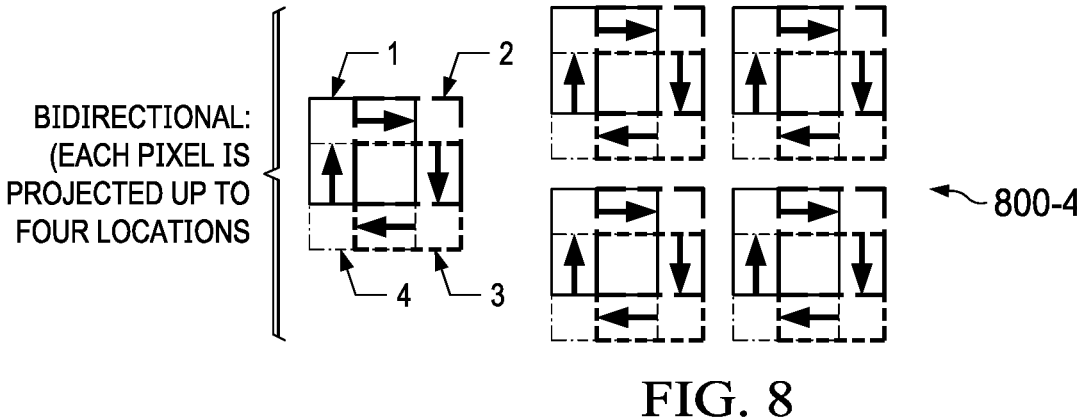
FIG. 8 is a set of diagrams illustrating unidirectional and bidirectional pixel shifting in accordance with some embodiments.

FIG. 8 is a set of diagrams 800 illustrating unidirectional and bidirectional pixel shifting in accordance with some embodiments. Diagrams 800-1, 800-2, and 800-3 illustrate how pixels may be shifted using a unidirectional pixel shifter such as the pixel shifters 306 of the first arm 305-1 and the second arm 305-2 of the device 300 of FIG. 3. In particular, depending on the orientation of the first arm 305-1 and the second arm 305-2 and the optic axis or tilt of the birefringent slab 504, each individual pixel may be shifted horizontally, vertically, or diagonally to produce two virtual pixels for each native pixel of the light engine. As shown in diagram 800-4, by using a bidirectional pixel shifter such as the pixel shifter 706 of FIG. 7, each individual pixel may be shifted horizontally and vertically to produce up to four virtual pixels for each native pixel of the light engine. Although diagram 800-4 illustrates horizontal and vertical shifting, diagonal shifting may also be implemented depending on the orientation of the first arm 305-1 and the second arm 305-2 and the optical axis or tilt of the first birefringent slab 504 and the second birefringent slab 704.

Figure 9:
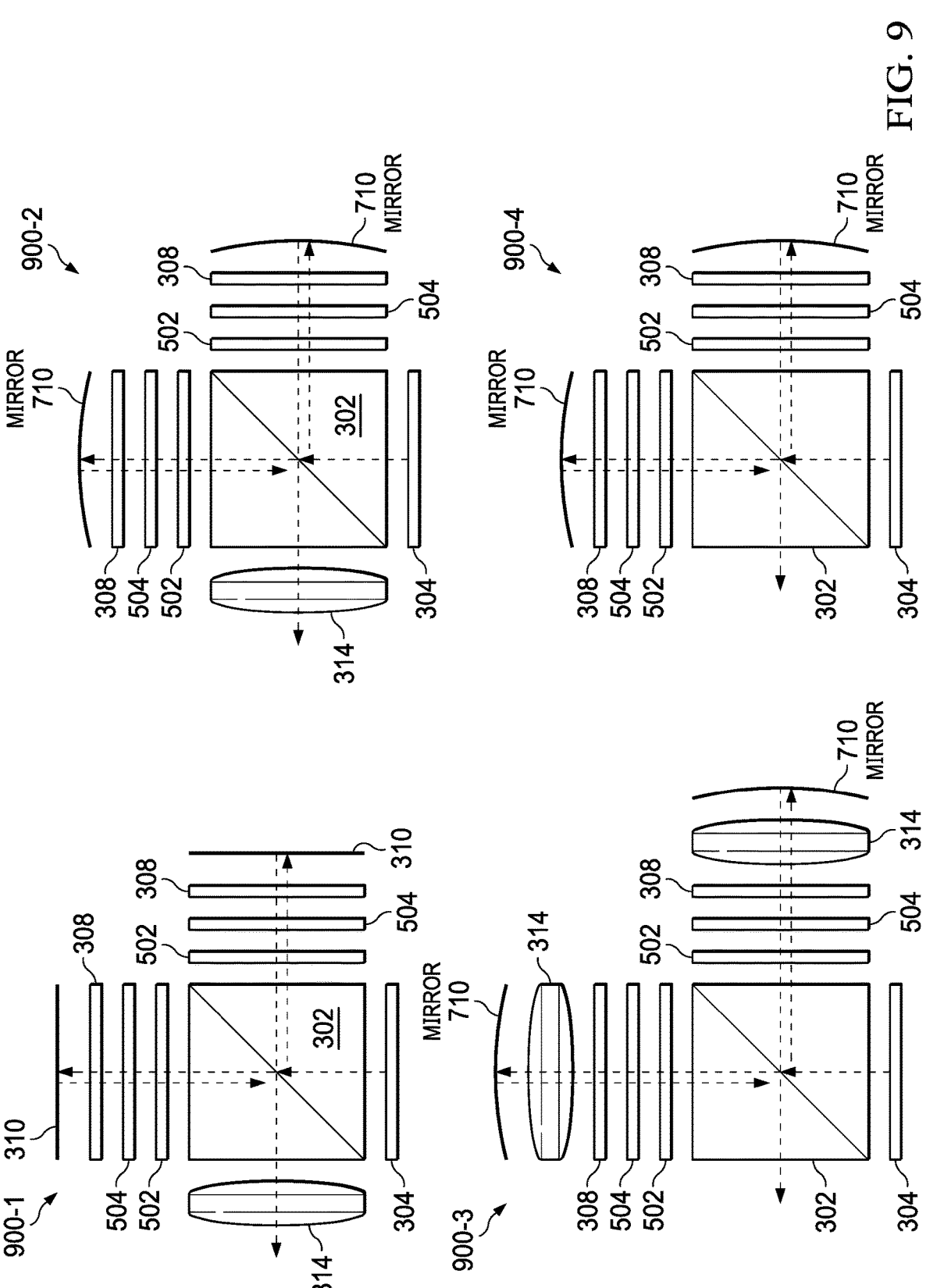
FIG. 9 is a set of diagrams illustrating various devices configured to pixel shift time-division multiplexed unpolarized display light to produce an increased perceived display resolution in accordance with some embodiments.

FIG. 9 is a set of diagrams 900 illustrating various devices configured to pixel shift time-division multiplexed unpolarized display light to produce an increased perceived display resolution and to provide a projection function for AR displays that functions similarly to the device 300 of FIG. 3 in accordance with some embodiments. Diagram 900-1 illustrates a configuration similar to that of device 300 of FIG. 3 using flat mirrors 310 and an external lens 314. Diagram 900-2 illustrates a configuration using curved or free-form mirrors 710 that enhance projection capabilities. Diagram 900-3 illustrates a configuration that uses curved mirrors 710 with one or more lens 314 located between the mirrors 710 and the QWPs 308, which increases compactness but also may increase the weight of the device due to the use of two lenses. Diagram 900-4 illustrates a configuration similar to those of diagrams 900-2 and 900-3 but with the lenses omitted. In this configuration, projection functionality is provided exclusively by the mirrors 710, enabling a more compact and lighter-weight implementation, but pixel shifting uniformity may be impacted and the birefringent slabs 504 may need to have double the thickness compared to, e.g., the device 300 of FIG. 3 to produce the same amount of pixel shifting.

Figure 10:
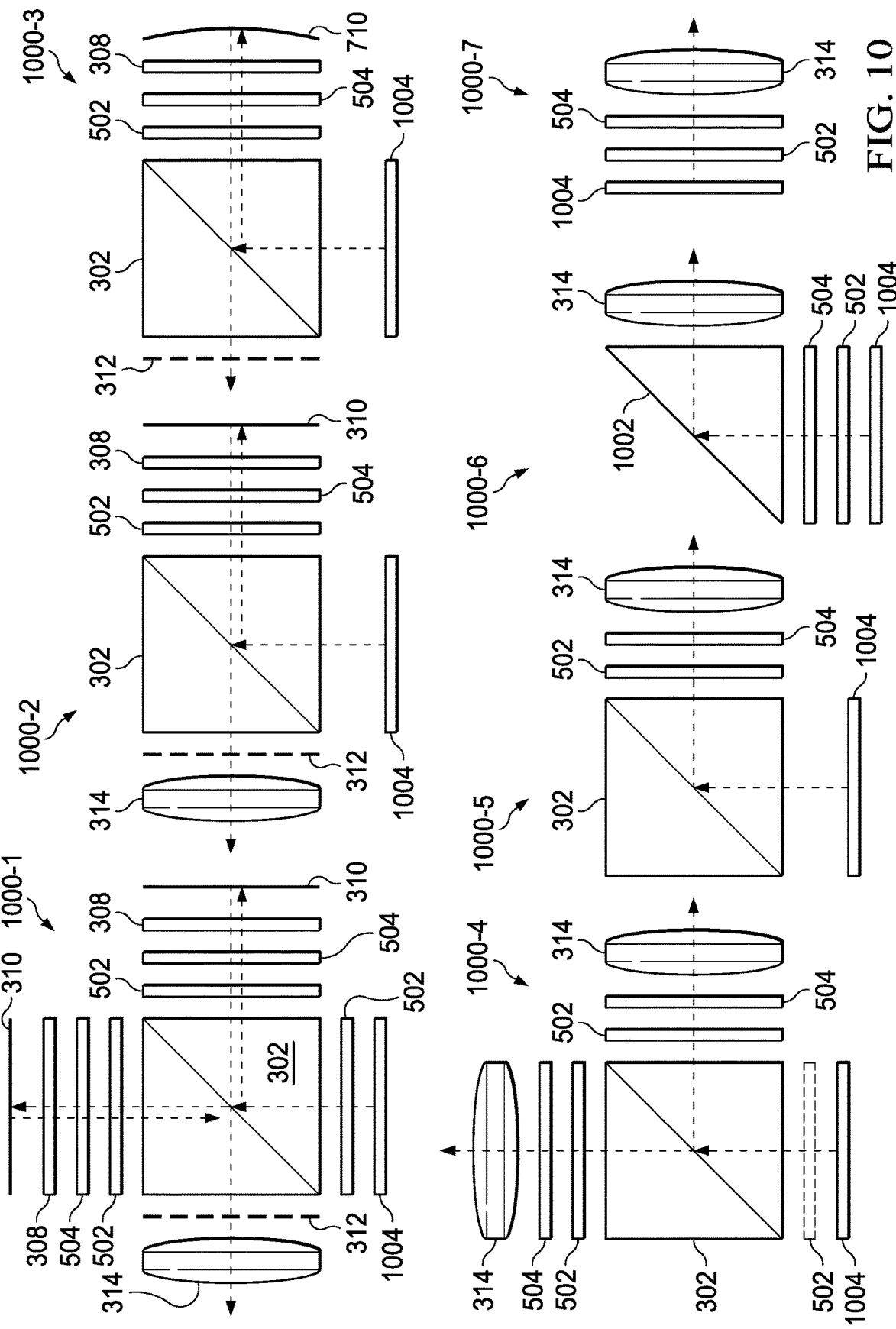
FIG. 10 is a set of diagrams illustrating various devices configured to pixel shift time-division multiplexed polarized display light to produce an increased perceived display resolution in accordance with some embodiments.

FIG. 10 is a set of diagrams illustrating various reflective (1000-1 to 1000-3) and transmissive (100-4 to 1000-7) devices configured to project and pixel shift time-division multiplexed polarized display light to produce an increased perceived display resolution in accordance with some embodiments. Polarized light may be provided by a micro-display such as a liquid crystal on silicon (LCOS) display, a laser scanning projector, a digital light processing (DLP)

display with polarized illumination, a display emitting unpolarized light through a polarizer, or an emissive display producing polarized light. In some embodiments, the displays may be monochrome displays or color displays with spatial (subpixels) and time sequence of colors. Diagram 1000-1 illustrates a configuration with a switchable half-wave plate 502 located between the light engine 1004 (e.g., a micro-display) and the PBS 302 and a half-wave plate 312 located between the PBS 302 and the lens 314. Depending on the polarization of the light provided by the light engine 1004, the switchable half-wave plate 502 located between the light engine 1004 and the PBS 302 may be omitted, as static polarization of the light engine 1004 will only result in one PBS arm being utilized (see, e.g., diagram 1000-2). Additionally, the half-wave plate 312 located between the PBS 302 and the lens 314 may be omitted if the polarization of light exiting the PBS 302 is not desired to be identical to the polarization of the light provided by the light engine 1004. For displays such as LCOS and DLP, an illumination source is typically utilized. In some cases, polarized illumination sources (unpolarized sources such as LEDs or lamps with polarizers, or polarized sources such as lasers) may be inserted with collimating optics into one of the PBS arms to reduce the size of the overall light engine, while the other arm could be used for a pixel shifting and/or projection function. Additionally, if the illumination sources for such displays are external to the PBS 302, the switchable half-wave plate 502 may be used to switch between the two arms where different pixel shifters are located (for example, to provide shifting in orthogonal directions).

Diagram 1000-2 illustrates a configuration with a single PBS arm and half-wave plate 312 located between the PBS 302 and the lens 314. As with the configuration in diagram 1000-1, the half-wave plate 312 located between the PBS 302 and the lens 314 may be omitted if the polarization of light exiting the PBS 302 is not desired to be identical to the polarization of the light provided by the light engine 1004. Diagram 1000-3 illustrates a configuration with a single PBS arm, a curved mirror 710, a half-wave plate 312 located at the output of the PBS 302, and no lens.

Diagram 1000-4 illustrates a configuration with a switchable half-wave plate 502 located between the light engine 1004 and the PBS 302 with lenses at the ends of each PBS arm rather than half-wave plates and mirrors. This configuration provides beam splitting as well as beam shifting and may be utilized for pixel shifting in single-projector biocular/binocular waveguide displays, such as where the arms would supply images to both eyes from a single micro-display. Diagram 1000-5 illustrates a configuration with a single PBS arm and a lens at the end of the PBS arm. Diagram 1000-6 illustrates a configuration with a switchable half-wave plate 502 and a birefringent slab 504 located between the light engine 1004 and a prism 1002 or mirror rather than a PBS, with a lens located at the output of the prism. Diagram 1000-7 illustrates a configuration with a light engine 1004 such as a micro-display, a switchable half-wave plate 502, a birefringent slab 504, and a lens 314, where the light engine 1004 directly transmits light through the switchable half-wave plate 502, the birefringent slab 504, and the lens 314 with no PBS and no prism.

Figure 11:
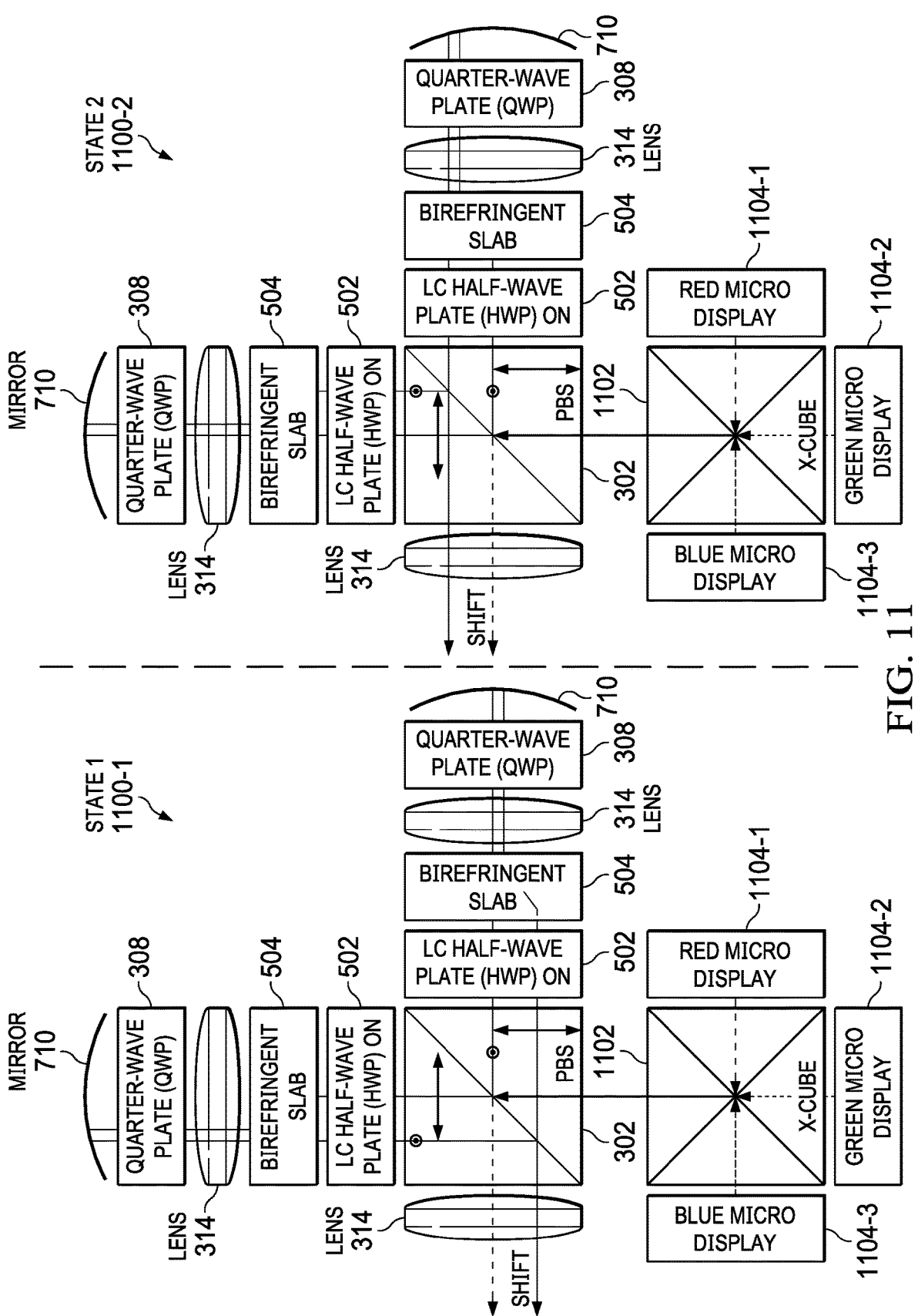
FIG. 11 is a set of diagrams illustrating an example of pixel shifting using a device configured to pixel shift a time-division multiplexed X-cube display to produce an increased perceived display resolution in accordance with some embodiments.

FIG. 11 is a set of diagrams 1100 illustrating an example of pixel shifting using a device configured to pixel shift a time-division multiplexed X-cube 1102 display to produce an increased perceived display resolution in accordance with some embodiments. This configuration is similar to the device 300 of FIG. 3; however, a red micro-display 1104-1, a green micro-display 1104-2, and a blue micro-display

1104-3 are combined using the X-cube 1102 rather than using a single micro-display capable of producing RGB light. Diagram 1100-1 illustrates a negative vertical shift relative to the orientation of the drawing, while diagram 1100-2 illustrates a positive vertical shift relative to the orientation of the drawing. Although FIG. 11 illustrates a unidirectional pixel shifter, a bidirectional pixel shifter like that described above in connection with FIG. 7 may be utilized. Each arm of this configuration is similar to the device 300 of FIG. 3; however, a red micro-display 1104-1, a green micro-display 1104-2, and a blue micro-display 1104-3 are combined using the X-cube 1102 rather than using a single micro-display capable of producing RGB light. Note that in the particular example shown, the light paths are shown assuming that the mirrors are flat, where the extra passive half-wave plate in one of the PBS arms can be removed. In a more general case, an extra half-wave plate may be inserted in one of the PBS arms as shown in FIG. 3, additional lenses may be present, and the mirrors may be curved. In this case, the shifts in the two states in a more general case may be different from shifts illustrated herein.

Figure 12:
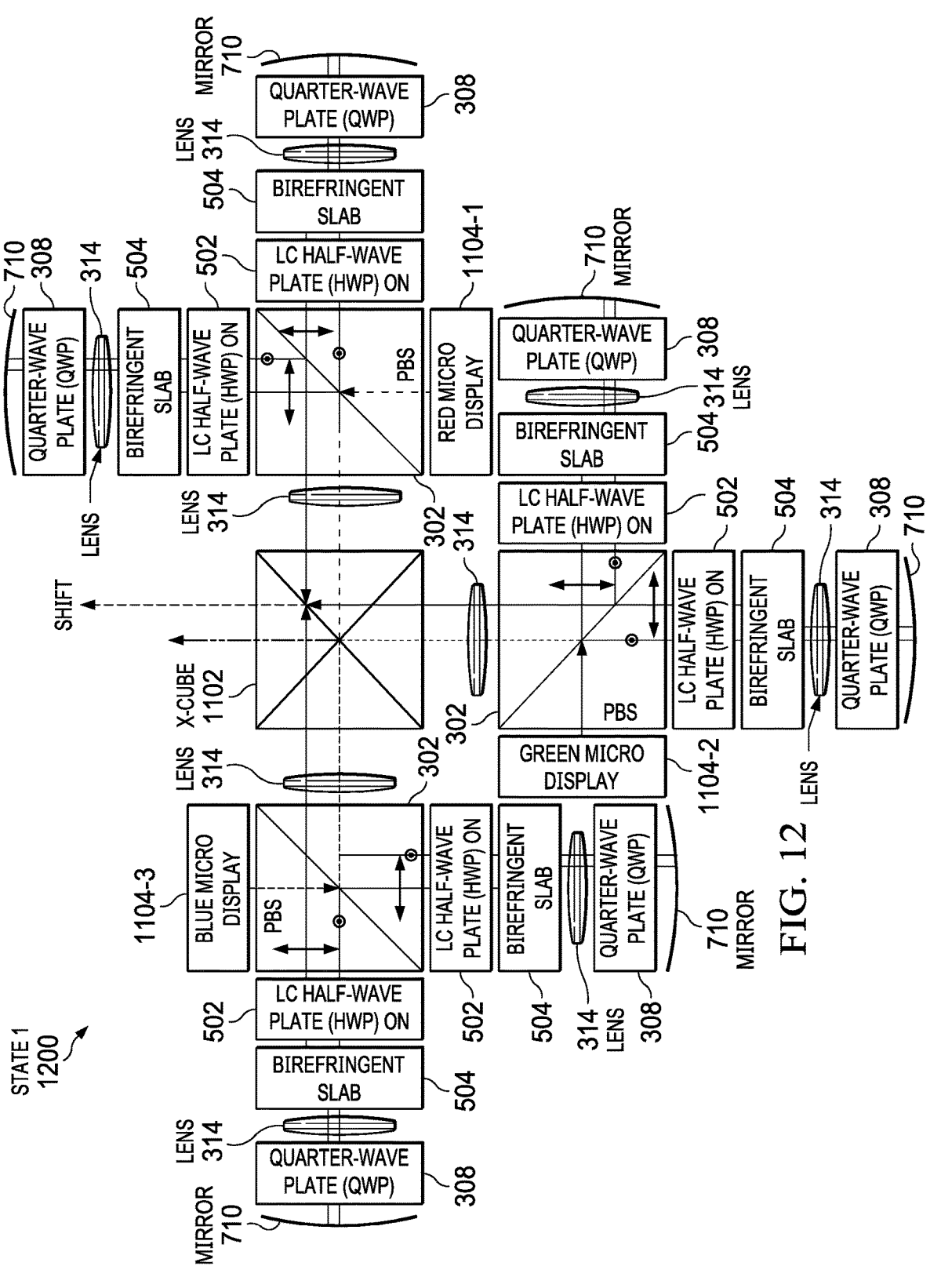
FIG. 12 is a diagram illustrating another example of pixel shifting using a device configured to pixel shift using a time-division multiplexed X-cube 1102 display to produce an increased perceived display resolution in accordance with some embodiments.
Figure 13:
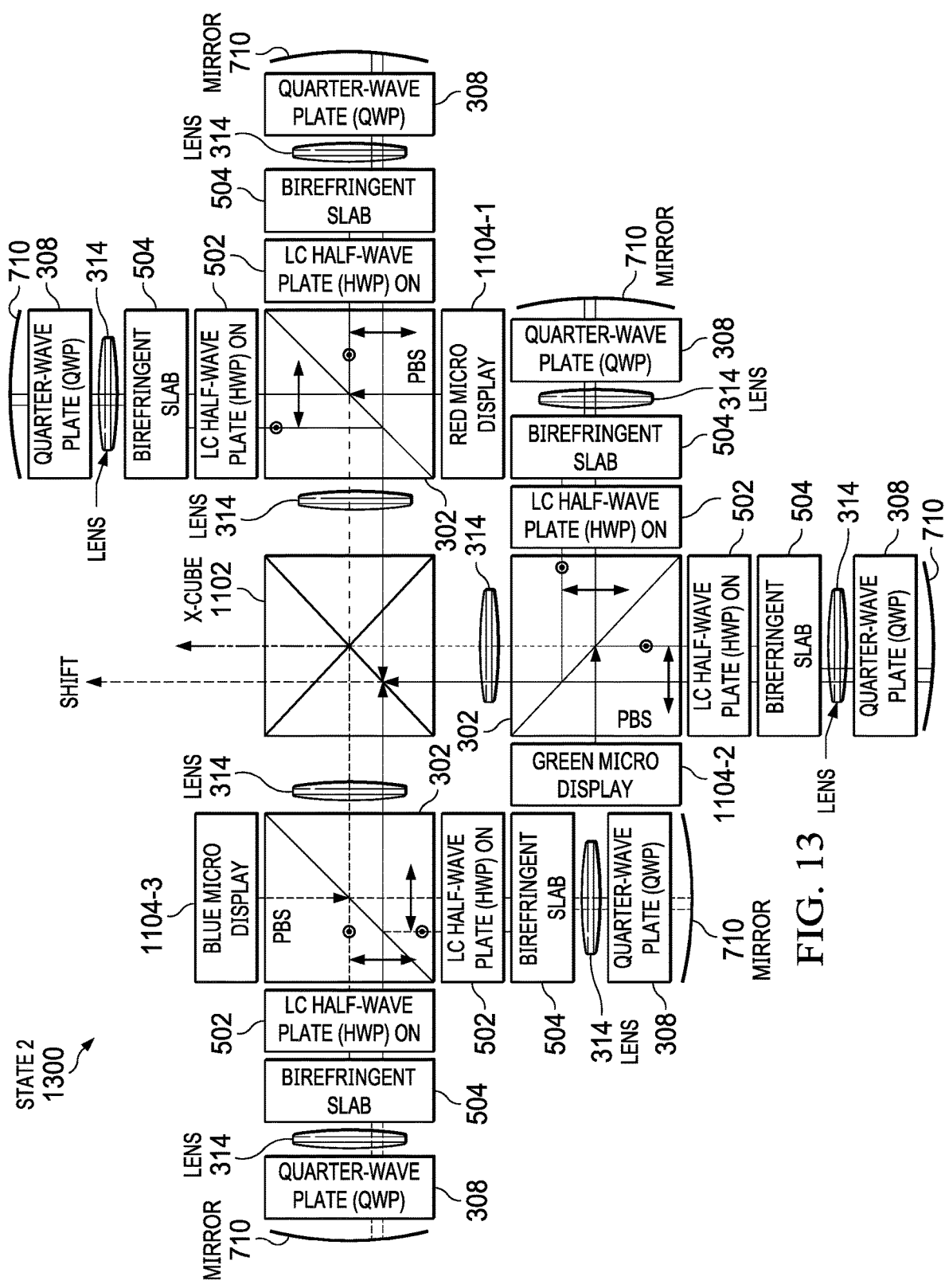
FIG. 13 is a diagram illustrating an example operation of unidirectional pixel shifting in the time-division multiplexed X-cube display of FIG. 12 in accordance with some embodiments.

FIG. 12 is a diagram 1200 illustrating another example of pixel shifting using a device configured to pixel shift using a time-division multiplexed X-cube 1102 display to produce an increased perceived display resolution in accordance with some embodiments. FIG. 13 is a diagram 1300 illustrating an example operation of unidirectional pixel shifting in the time-division multiplexed X-cube display of FIG. 12 in accordance with some embodiments. Generally, FIGS. 12 and 13 illustrate an implementation where PBSs 302 and corresponding PBS arms are implemented prior to light entering the X-cube 1102, while FIG. 11 illustrates an implementation where the PBS 302 and corresponding PBS arms are implemented subsequent to light entering the X-cube 1102. As can be seen comparing diagram 1200 of FIG. 12 to diagram 1300 of FIG. 13, diagram 1200 illustrates a negative horizontal shift relative to the orientation of the drawing, while diagram 1100-2 illustrates a positive horizontal shift relative to the orientation of the drawing. Similar to the configuration of FIG. 11, although FIGS. 12 and 13 illustrate unidirectional pixel shifters, bidirectional pixel shifters such as that described above in connection with FIG. 7 may be utilized. As with FIG. 11, the light paths are shown assuming that the mirrors are flat. In a more general case, an extra half-wave plate may be inserted in one of the PBS arms as shown in FIG. 3, additional lenses may be present, and the mirrors may be curved. In this case, the shifts in FIG. 12 and FIG. 13 may be different from each other. As noted above with reference to FIG. 5 and FIG. 6, the relative orientations of the optical axes of the birefringent plates, the relative orientations and states of the switchable half-wave plates, and the presence/absence of half-wave plates in the two PBS arms in, e.g., FIGS. 7, 9, 10, 11, 12, and 13 are all design parameters to ensure conditions similar to that of FIG. 4 are satisfied.

FIG. 14 is a flow diagram of a method 1400 of pixel shifting a time-division multiplexed display to produce an increased perceived display resolution in accordance with some embodiments. The method 1400 may be implemented using the device 300 of FIG. 3 or any of the other configurations disclosed herein that receive unpolarized input light at the PBS 302 and produce unpolarized output light at the output of the PBS 302. At block 1402, the method 1400 includes receiving unpolarized input light from an emissive display such as micro-display 304 at a PBS such as PBS 302. At block 1404, the method 1400 includes receiving polarized light from the PBS at a first PBS arm such as the first PBS arm 305-1 of FIG. 3 comprising a first pixel shifter, a first QWP, and a first mirror. At block 1406, the method 1400 includes receiving polarized light from the PBS at a second PBS arm such as the second PBS arm 305-2 of FIG. 3 comprising a half-wave plate, a second pixel shifter, a second QWP, and a second mirror. At block 1408, the method 1400 includes combining reflected polarized, shifted light from the first PBS arm and the second PBS arm at the PBS to produce unpolarized output light.

In some embodiments, the method 1400 further includes time-division multiplexing the input light from the emissive display in synchronization with switching of the first pixel shifter and the second pixel shifter to produce a plurality of virtual pixels in the unpolarized output light. In some embodiments, the method 1400 further includes selectively switching a first switchable half-wave plate such as the switchable half-wave plate 502 of FIG. 5 to produce two virtual pixels at two different locations in the unpolarized output light. In some embodiments, the method 1400 further includes selectively switching a first switchable half-wave plate such as the first switchable half-wave plate 502 of FIG. 7 and a second switchable half-wave plate such as the second switchable half-wave plate 502 of FIG. 7 to produce four virtual pixels at four different locations in the unpolarized output light.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device comprising:
   a polarizing beam splitter (PBS) positioned to receive unpolarized input light from an display;
   a first PBS arm positioned to receive polarized light from the PBS, the first PBS arm comprising a first pixel shifter, a first quarter-wave plate (QWP), and a first mirror; and
   a second PBS arm positioned to receive polarized light from the PBS, the second PBS arm comprising a half-wave plate, a second pixel shifter, a second QWP, and a second mirror,
   wherein the PBS combines reflected polarized, shifted light from the first PBS arm and the second PBS arm to produce unpolarized output light.

2. The device of claim 1, wherein the input light from the display is time-division multiplexed in synchronization with switching of the first pixel shifter and the second pixel shifter to produce a plurality of virtual pixels in the unpolarized output light.

3. The device of claim 1, wherein the first pixel shifter comprises a first switchable polarization rotator and a first birefringent slab.

4. The device of claim 3, wherein the first birefringent slab has a tilted optic axis with respect to a normal axis of the first birefringent slab at which light is directed into the first birefringent slab from the PBS.

5. The device of claim 3, wherein selectively switching the first switchable polarization rotator produces two virtual pixels at two different locations in the unpolarized output light.

6. The device of claim 3, wherein the first pixel shifter comprises a second switchable polarization rotator and a second birefringent slab.

7. The device of claim 6, wherein the second birefringent slab has an optic axis orthogonally aligned with the optic axis of the first birefringent slab.

8. The device of claim 6, wherein selectively switching the first switchable polarization rotator and the second switchable polarization rotator produces four virtual pixels at four different locations in the unpolarized output light.

9. A method comprising:

receiving unpolarized input light from an display at a polarizing beam splitter (PBS);

receiving polarized light from the PBS at a first PBS arm comprising a first pixel shifter, a first quarter-wave plate (QWP), and a first mirror;

receiving polarized light from the PBS at a second PBS arm comprising a half-wave plate, a second pixel shifter, a second QWP, and a second mirror; and combining reflected polarized, shifted light from the first PBS arm and the second PBS arm at the PBS to produce unpolarized output light.

10. The method of claim 9, further comprising time-division multiplexing the input light from the display in synchronization with switching of the first pixel shifter and the second pixel shifter to produce a plurality of virtual pixels in the unpolarized output light.

11. The method of claim 9, wherein the first pixel shifter comprises a first switchable polarization rotator and a first birefringent slab.

12. The method of claim 11, wherein the first birefringent slab has a tilted optic axis with respect to a normal axis of the first birefringent slab at which light is directed into the first birefringent slab from the PBS.

13. The method of claim 11, further comprising selectively switching the first switchable polarization rotator to produce two virtual pixels at two different locations in the unpolarized output light.

14. The method of claim 11, wherein the first pixel shifter comprises a second switchable polarization rotator and a second birefringent slab.

15. The method of claim 14, wherein the second birefringent slab has an optic axis orthogonally aligned with the optic axis of the first birefringent slab.

16. The method of claim 14, further comprising selectively switching the first switchable polarization rotator and the second switchable polarization rotator to produce four virtual pixels at four different locations in the unpolarized output light.

17. A non-transitory computer readable medium embodying a set of executable instructions, the set of executable instructions to manipulate at least one processor to:

transmit unpolarized input light from an display to a polarizing beam splitter (PBS), wherein:

polarized light from the PBS is received at a first PBS arm comprising a first pixel shifter, a first quarter-wave plate (QWP), and a first mirror, and polarized light from the PBS is received at a second PBS arm comprising a half-wave plate, a second pixel shifter, a second QWP, and a second mirror; and reflected polarized, shifted light from the first PBS arm and the second PBS arm is combined at the PBS to produce unpolarized output light.

18. The non-transitory computer readable medium of claim 17, the set of executable instructions to further manipulate the at least one processor to time-division multiplex the input light from the display in synchronization with switching of the first pixel shifter and the second pixel shifter to produce a plurality of virtual pixels in the unpolarized output light.

19. The non-transitory computer readable medium of claim 17, the set of executable instructions to further manipulate the at least one processor to selectively switch a switchable polarization rotator in the first pixel shifter to produce two virtual pixels at two different locations in the unpolarized output light.

20. The non-transitory computer readable medium of claim 17, the set of executable instructions to further manipulate the at least one processor to selectively switch two switchable polarization rotators in the first pixel shifter to produce four virtual pixels at four different locations in the unpolarized output light.

* * * * *